(12) United States Patent
Wang et al.

(10) Patent No.: US 12,010,417 B2
(45) Date of Patent: Jun. 11, 2024

(54) CAMERA MODULE AND TERMINAL DEVICE

(71) Applicant: Honor Device Co., Ltd., Shenzhen (CN)

(72) Inventors: Wei Wang, Shenzhen (CN); Weibo Zhang, Shenzhen (CN); Xu Liu, Shenzhen (CN); Wancheng Qian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 225 days.

(21) Appl. No.: 17/765,966

(22) PCT Filed: Dec. 25, 2020

(86) PCT No.: PCT/CN2020/139554
§ 371 (c)(1),
(2) Date: Apr. 1, 2022

(87) PCT Pub. No.: WO2021/129825
PCT Pub. Date: Jul. 1, 2021

(65) Prior Publication Data
US 2022/0394162 A1    Dec. 8, 2022

(30) Foreign Application Priority Data

Dec. 27, 2019 (CN) .......................... 201911383235.2

(51) Int. Cl.
*H04N 23/57* (2023.01)
*G02B 5/20* (2006.01)
*H04N 23/51* (2023.01)
*H04N 23/54* (2023.01)
*H04N 23/55* (2023.01)

(52) U.S. Cl.
CPC ............. *H04N 23/57* (2023.01); *H04N 23/51* (2023.01); *H04N 23/54* (2023.01); *H04N 23/55* (2023.01); *G02B 5/20* (2013.01)

(58) Field of Classification Search
CPC ........ H04N 23/57; H04N 23/51; H04N 23/54; H04N 23/55; G02B 5/20; G03B 30/00; G03B 2205/0007
See application file for complete search history.

(56) References Cited

U.S. PATENT DOCUMENTS 5,783,815 A * 7/1998 Ikeda ................. H01L 27/14618
257/E31.127
5,999,238 A * 12/1999 Ihara ................. G02F 1/133615
349/64

(Continued)

FOREIGN PATENT DOCUMENTS

CN       102082935 A      6/2011
CN       203278999 U      11/2013

(Continued)

*Primary Examiner* — Christopher K Peterson
(74) *Attorney, Agent, or Firm* — Conley Rose, P.C.

(57) ABSTRACT

A camera module and a terminal device are disclosed. The camera module includes a support mechanism, a filter and a sensor disposed corresponding to the filter, where the support mechanism includes substrates, support frames and buffers, the support frames each are disposed on the substrate, an edge of the filter is fixed on the support frame, and the buffers each are disposed between the substrate and the support frame. In this way, even if a suspended area of the filter increases relative to the sensor and shaking moment of the filter acting on the support frame increases, the support frame does not shake significantly relative to the substrate, and can keep its own stability under effective support by the buffer, which significantly reduces a probability of collision between the support frame and the filter, thereby ensuring assembly stability and integrity of the filter when the suspended area increases.

20 Claims, 8 Drawing Sheets

(56) References Cited

U.S. PATENT DOCUMENTS

| | | |
|---|---|---|
| 11,283,977 B2 | 3/2022 | Xu et al. |
| 2010/0110262 A1 | 5/2010 | Shirono |
| 2014/0267767 A1 | 9/2014 | Choi et al. |
| 2016/0305891 A1* | 10/2016 | Olsson ................. E03F 7/12 |
| 2017/0214831 A1* | 7/2017 | Ha ................... H04N 23/54 |
| 2020/0007722 A1* | 1/2020 | Chen .................. G02B 7/04 |
| 2021/0028210 A1 | 1/2021 | Okamoto et al. |

FOREIGN PATENT DOCUMENTS

| | | |
|---|---|---|
| CN | 203414614 U | 1/2014 |
| CN | 206136093 U | 4/2017 |
| CN | 106993123 A | 7/2017 |
| CN | 207184654 U | 4/2018 |
| CN | 108076271 A | 5/2018 |
| CN | 207820032 U | 9/2018 |
| CN | 108632514 A | 10/2018 |
| CN | 208112753 U | 11/2018 |
| CN | 109274876 A | 1/2019 |
| CN | 208489924 U | 2/2019 |
| CN | 109525769 A | 3/2019 |
| CN | 109672806 A | 4/2019 |
| CN | 208739213 U | 4/2019 |
| CN | 110248068 A | 9/2019 |
| CN | 110351455 A | 10/2019 |
| JP | 2005236830 A | 9/2005 |
| JP | 2013246421 A | 12/2013 |
| WO | 2018028718 A1 | 2/2018 |

\* cited by examiner

CAMERA MODULE AND TERMINAL DEVICE

This application is a U.S. National Stage of International Application No. PCT/CN2020/139554 filed on Dec. 25, 2020, which claims the priority to Chinese Patent Application No. 201911383235.2, filed with China National Intellectual Property Administration on Dec. 27, 2019, both of which are incorporated herein by reference in their entireties.

TECHNICAL FIELD

This application relates to the field of electronic device technologies, and in particular, to a camera module and a terminal device.

BACKGROUND

Terminal devices such as mobile phones each are usually provided with a camera module. A light-sensing senor is disposed in the camera module, and a filter is usually provided in front of the senor to filter light. In recent years, users have increasingly higher requirements for photographing pixels of terminal devices such as mobile phones, which leads to a corresponding increase in the size of the sensor in the camera module. However, the filter located in front of the sensor is suspended in front of the sensor through a support, and a larger size of the sensor indicates a larger suspended area of the filter, resulting in a decrease in assembly stability of the filter.

SUMMARY

An objective of this application is to provide a camera module and a terminal device, so as to resolve the technical problem in the prior art that assembly stability of a filter in a camera module decreases as a size of the sensor increases.

To achieve the foregoing objective, technical solutions according to embodiments of this application are as follows:

According to a first aspect, a camera module is provided, including a support mechanism, a filter and a sensor disposed corresponding to the filter, where the support mechanism includes substrates, support frames and buffers, the support frames each are disposed on the substrate, an edge of the filter is fixed on the support frame, and the buffers each are disposed between the substrate and the support frame. In this way, because the buffers each can provide effective support between the support frame and the substrate, even if a suspended area of the filter increases relative to the sensor and shaking moment of the filter acting on the support frame increases, the support frame does not shake significantly relative to the substrate, and can keep its own stability under effective support by the buffer to stably support the filter, which significantly reduces a probability of collision between the support frame and the filter, thereby ensuring assembly stability and integrity of the filter when the suspended area increases.

Optionally, there are at least three support frames and at least three substrates, all the substrates are distributed on a periphery of the sensor, and all the support frames are distributed on a periphery of the filter and disposed on the corresponding substrates respectively. In this way, each of the support frames can stably support the filter in the circumferential direction, ensure isotropy of forces on the filter, and further improve assembly stability of the filter when the suspended area increases.

Optionally, there are two support frames and two substrates, the two substrates are disposed on two opposite sides of the sensor respectively, and the two support frames are disposed on the two substrates respectively and located on two opposite sides of the filter respectively. In this way, the quantity of the support frames and the quantity of the substrates each may be specifically limited to two. On the one hand, the force balance of the filter is ensured, and on the other hand, the overall manufacturing cost of the camera module is effectively controlled.

Optionally, one side of each of the support frames facing the filter is provided with a lap joint notch, and the edge of the filter is fixed in the lap joint notch. The lap joint notch is provided, so that the edge of the filter is fixed in the lap joint notch. On the one hand, this enables the filter and the support frame to be quickly and stably assembled; and on the other hand, the lap joint notch can further precisely limit the filter, thereby ensuring accuracy of relative positions of the filter and the sensor.

Optionally, the edge of the filter is fixed in the lap joint notch by using an adhesive. This can ensure assembly stability of the filter and the support frame. In addition, because the adhesive further has a certain cushioning performance, vibration between the filter and the support frame is further reduced, and assembly stability of the filter relative to the support frame is improved.

Optionally, the support frames each include a clamping part, and the edge of the filter is clamped in the clamping part. Clamping assembly between the filter and the support frame can reduce costs of assembly between the filter and the support frame and improve assembly efficiency.

Optionally, the buffers each are disposed between the clamping part and the corresponding substrate. Specifically, the buffers each are disposed between the clamping part and the substrate, which can directly offset the pressure of the filter acting on the clamping part, thereby significantly reducing a shaking amplitude of the clamping part protruding out of a main body of the support frame.

Optionally, the support frames each are an annular frame, the substrates each are an annular plate, the substrates are annularly disposed on the periphery of the sensor, and the support frames are disposed on the substrates and annularly disposed on the periphery of the filter. The support frames and the substrates are annular, which can enhance overall mechanical properties of the support frames and the substrates, thereby enabling the support frames to provide more stable support for the filter.

Optionally, an edge of one side of each of the support frames facing the filter is provided with an assembly ring step, and the peripheral edge of the filter is disposed and fixed on the assembly ring step. When the support frame is annular, the side of the support frame facing the filter is provided with the assembly ring step, which improves assembly efficiency and accuracy of the filter and the support frame while ensuring that the support frame stably supports the filter.

Optionally, the buffers each are integrally formed with the substrate or the support frame; or, the buffers each are an independent component and assembled between the support frame and the substrate. The integral forming of the buffer with the substrate or the support frame can ensure assembly stability of the buffer, and the buffer as an independent component can be disassembled, replaced and repaired relative to the support frame and the substrate.

Optionally, the buffers each are an elastic member; or, the buffers each include a rigid member and a buffer layer disposed at least on one side of the rigid member facing the support frame. Specifically, when the buffer needs to bear a limited load, the buffer may be an elastic member, and when the buffer needs to bear a relatively large load, the buffer may alternatively be a rigid member with a buffer layer.

Optionally, the elastic member is a glass cement, a nail-free glue, a structural adhesive, foamed cotton, a spring or a silicone block encapsulated with the spring. Specifically, the buffer is set as the foregoing elastic object, which can provide a relatively flexible support for the support frame and can allow the support frame to have controllable elastic deformation redundancy, thereby ensuring that there is elastic redundancy in an assembly relationship between the support frame and the filter, and significantly reducing the probability that the support frame and the filter are damaged due to collision with each other when subjected to an external vibration force.

Optionally, the filter is an infrared cut-off filter. In this way, blue glass can effectively filter out a target surface virtual image formed by external infrared light acting on the sensor. Therefore, imaging quality of the camera module can be remarkably improved.

According to a second aspect, a terminal device is provided, including a display and the foregoing camera module, where the display is configured to display at least an image photographed by the camera module.

In the terminal device with the foregoing camera module according to the embodiment of this application, the filter in the terminal device can have good assembly stability while its suspended area increases, so that the terminal device can have larger photographing pixels and can also ensure good quality stability.

DESCRIPTION OF REFERENCE NUMERALS

Figure 1:
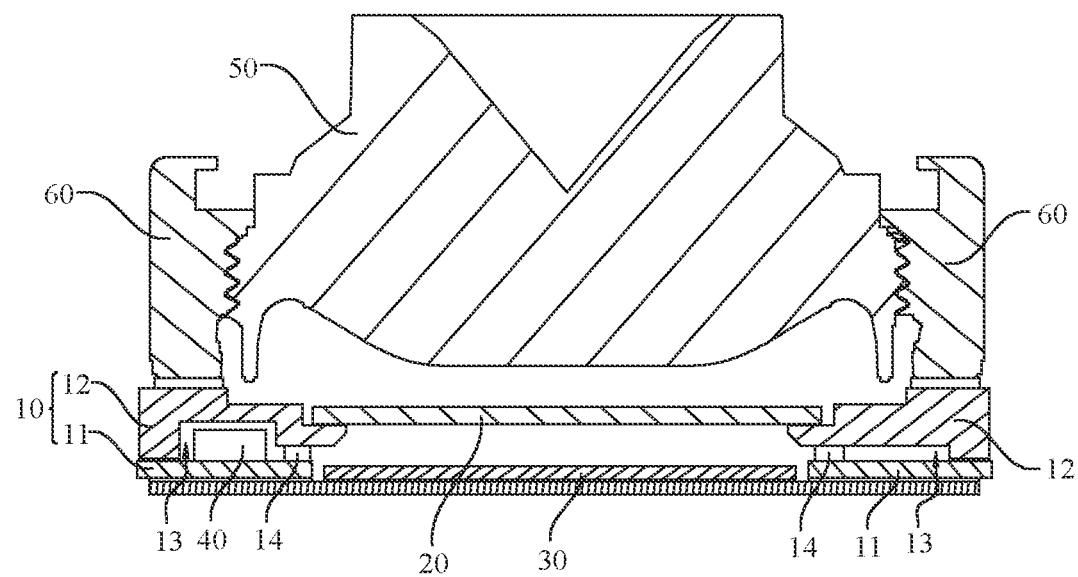
FIG. 1 is a schematic sectional structural diagram of a camera module according to an embodiment of this application.

10: Support mechanism 11: Substrate 12: Support frame
13: Assembly gap 14: Buffer 20: Filter
30: Sensor 40: Electronic device 50: Lens
60: Driving motor 121: Lap joint notch 122: Clamping part
123: Assembly ring step 124: Adhesive.

DESCRIPTION OF EMBODIMENTS

Embodiments of this application are described in detail below; and examples of the embodiments are shown in the accompanying drawings, where the same or similar reference numerals always indicate the same or similar elements or elements having the same or similar functions. Embodiments described below with reference to FIG. 1 to FIG. 11 are exemplary and are intended to explain this application, but cannot be understood as limiting this application.

In the description of this application, it should be understood that the orientation or positional relationship indicated by the terms "length". "width", "upper", "lower", "front", "rear", "left", "right", "vertical", "horizontal", "top", "bottom", "inner", "outer", and the like, is based on the orientation or positional relationship shown in the accompanying drawings, and is only for ease of describing this application and simplifying the description, rather than indicating or implying that the apparatus or component referred to must have a specific orientation, be constructed and operated in a specific orientation, which therefore cannot be understood as a limitation to this application.

In addition, the terms "first" and "second" are used for description only, and cannot be understood as indicating or implying relative importance or implicitly indicating the quantity of indicated technical features. Therefore, the features defined with "first" and "second" can explicitly or implicitly include one or more of the features. In the description of this application, "a plurality of" means two or more, unless otherwise specifically defined.

In this application, unless otherwise specified and defined, the terms, "install", "connected to", "connect", "fix", and the like, should be understood in a broad sense, for example, a connection may be a fixed connection, or a detachable connection, or an integrated connection; or a mechanical connection or an electric connection, or a direct connection, an indirect connection based on an intermediate medium, or internal communication between two elements or a relationship of interaction between two elements. For a person of ordinary skill in the art, the specific meanings of the above-mentioned terms in this application may be understood based on a specific situation.

An embodiment of this application provides a terminal device. The terminal device according to the embodiment of this application include, but is not limited to, a camera, a mobile phone, a tablet computer, a wearable device, an onboard device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or the like. No restriction is imposed on a specific type of the terminal device in the embodiment of this application. For ease of description, the terminal device in the embodiment of this application is described by taking a mobile phone as an example. It should be understood that the mobile phone cannot be interpreted as a limitation to this application.

Figure 2:
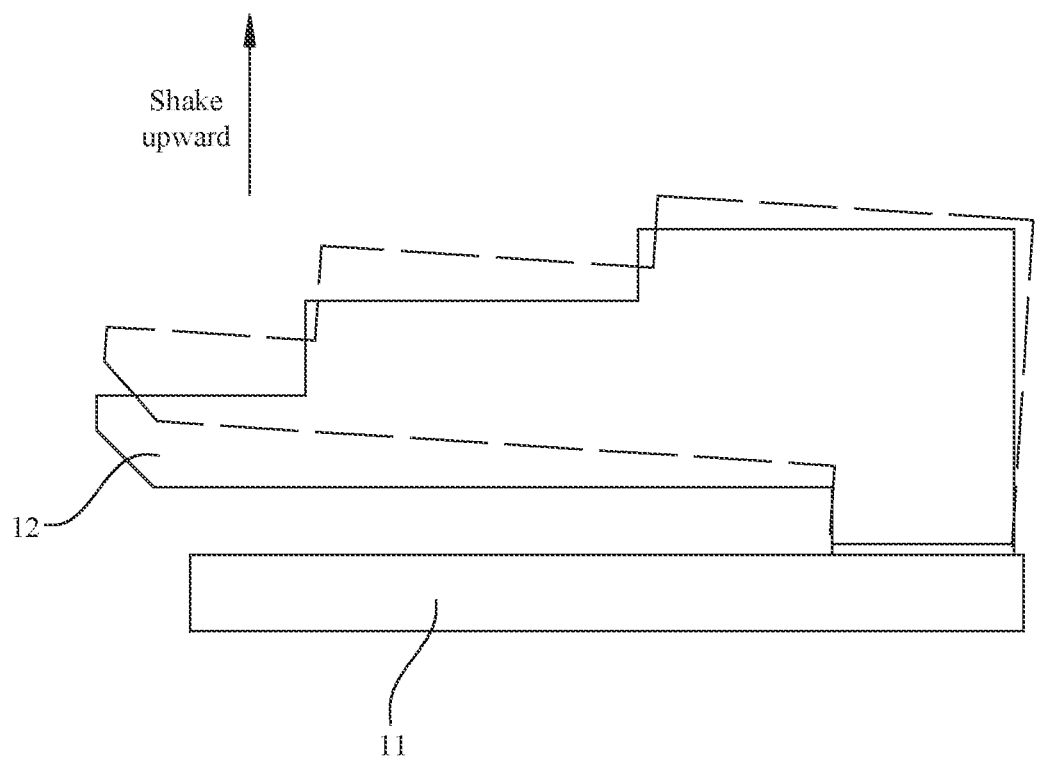
FIG. 2 is a schematic diagram of a shaking direction of a support frame of a camera module according to an embodiment of this application.
Figure 3:
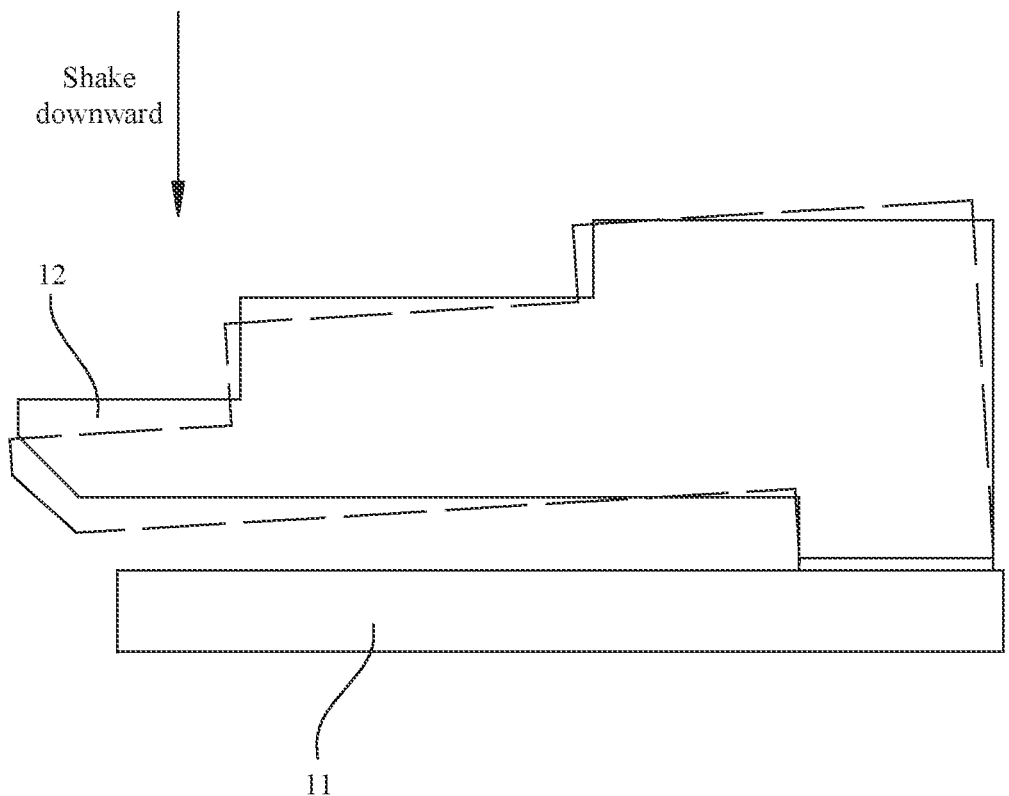
FIG. 3 is a schematic diagram of another shaking direction of a support frame of a camera module according to an embodiment of this application.

As shown in FIG. 1 to FIG. 3, the terminal device (not shown) includes a display and a camera module. The camera module is configured to realize photographing and video recording functions of the terminal device, and the display is configured to display at least an image photographed by the camera module. The camera module includes a lens 50, a driving motor 60 for driving the lens 50 to move, a filter 20 and a sensor 30 disposed corresponding to the filter 20.

The lens 50 is connected to the driving motor 60, so as to adjust a focal length relative to the sensor 30 under the driving by the driving motor 60. The lens 50 is disposed corresponding to the filter 20 and the sensor 30. External light can be incident on the sensor 30 by using the lens 50 and the filter 20, so that the sensor 30 can collect external image information.

Further, the camera module further includes a support mechanism 10, and the support mechanism 10 includes substrates 11, support frames 12 and buffers 14. The substrates 11 each serve as a reference support. The support frames 12 each are disposed on the substrate 11 and configured to fix the filter 20. When the filter 20 is assembled with the support frame 12, an edge part of the filter 20 is fixed on the support frame 12, so that most area of the filter 20 faces the sensor 30, thereby making full use of a filtering area of the filter 20.

As shown in FIG. 1, to prevent mutual interference between the support frame 11 and the substrate 12 during assembly due to a dimensional error, a part of the support frame 11 may be suspended relative to the substrate 12, so that an assembly gap 13 is formed between the support frame 11 and the substrate 12. Other smaller electronic devices 40 (such as a resistor and a capacitor) in the camera module may be disposed in the assembly gap 13 to make full use of the assembly gap of an assembly space in the camera module. For example, the assembly gaps 13 shown on the left and right sides in FIG. 1 can be used to accommodate a resistor, a capacitor, and the like. The electronic devices 40 are disposed in the assembly gap 13, so that on the one hand, the space in the camera module can be fully utilized to reduce the module size; and on the other hand, the electronic devices 40 can be effectively protected by the support frame 12 and the substrate 11 to significantly increase an intact rate of the electronic devices 40 under impact.

The electronic device 40 may not completely fill the assembly gap 13. For example, in FIG. 1, there is still a remaining assembly gap between the substrate and a filter connection part of the support frame (that is, a part connected to the filter). In the embodiment of the present embodiment, one buffer 14 is disposed in the remaining assembly gap. The buffer 14 can prevent the support frame 12 from shaking violently when impacted.

Figure 4:
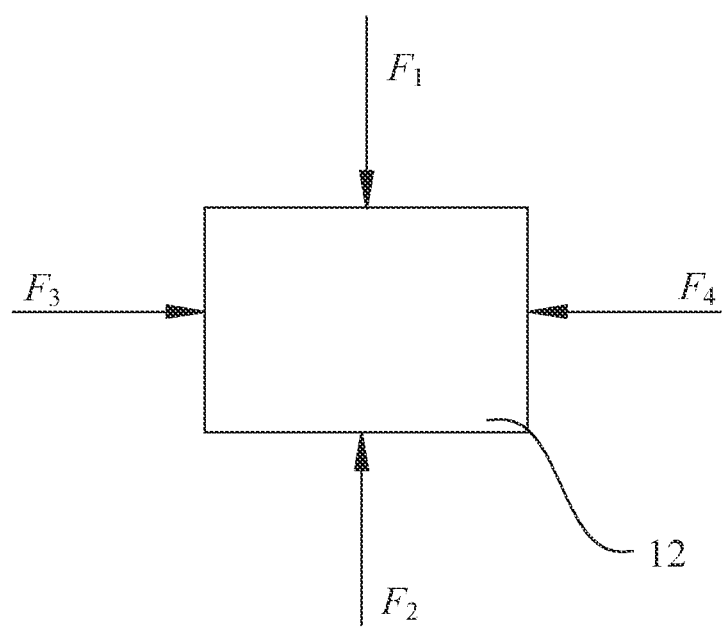
FIG. 4 is an analysis diagram of forces on a support frame of a camera module according to an embodiment of this application.

As shown in FIG. 4, the support frame 12 receives a downward pressure from the filter 20 (as shown by F1 in FIG. 4) and shaking moment generated by the downward pressure, and is also affected by two horizontal abutting forces (as shown by F3 and F4 in FIG. 4) in opposite directions from the filter 20 and a wall of an inner housing of the camera module. The buffer 14 can exert an upward reaction force on the support frame 12 (as shown by F2 in FIG. 4), so as to effectively buffer and balance the shaking moment of the filter 20 applied to the support frame 12, so that force balance of the support frame 12 is implemented.

Because the buffer 14 can provide force balance between the support frame 12 and the substrate 11, even if an area of the filter 20 increases (that is, a suspended area increases relative to the sensor 30, and the shaking moment of the filter 20 acting on the support frame 12 increases), the support frame 12 does not shake relative to the substrate 11 and stably supports the filter 20. This significantly reduces a probability of collision between the substrate 11 and the filter 20, thereby ensuring assembly stability and integrity of the filter 20 when the suspended area increases.

The embodiment of this application further provides the terminal device with the foregoing camera module, and the filter 20 in the terminal device can have good assembly stability while its suspended area increases, so that the terminal device can have larger photographing pixels and can also ensure good quality stability.

In some embodiments of this application, the driving motor 60 may be directly installed on the support frame 12. In this way, the support frame 12 also bears a downward pressure from the driving motor 60 while bearing the shaking moment from the filter 20. In this case, the buffer 14 can also provide an upward reaction force to the support frame 12, so that the support frame 12 can effectively support the driving motor 60.

Figure 5:
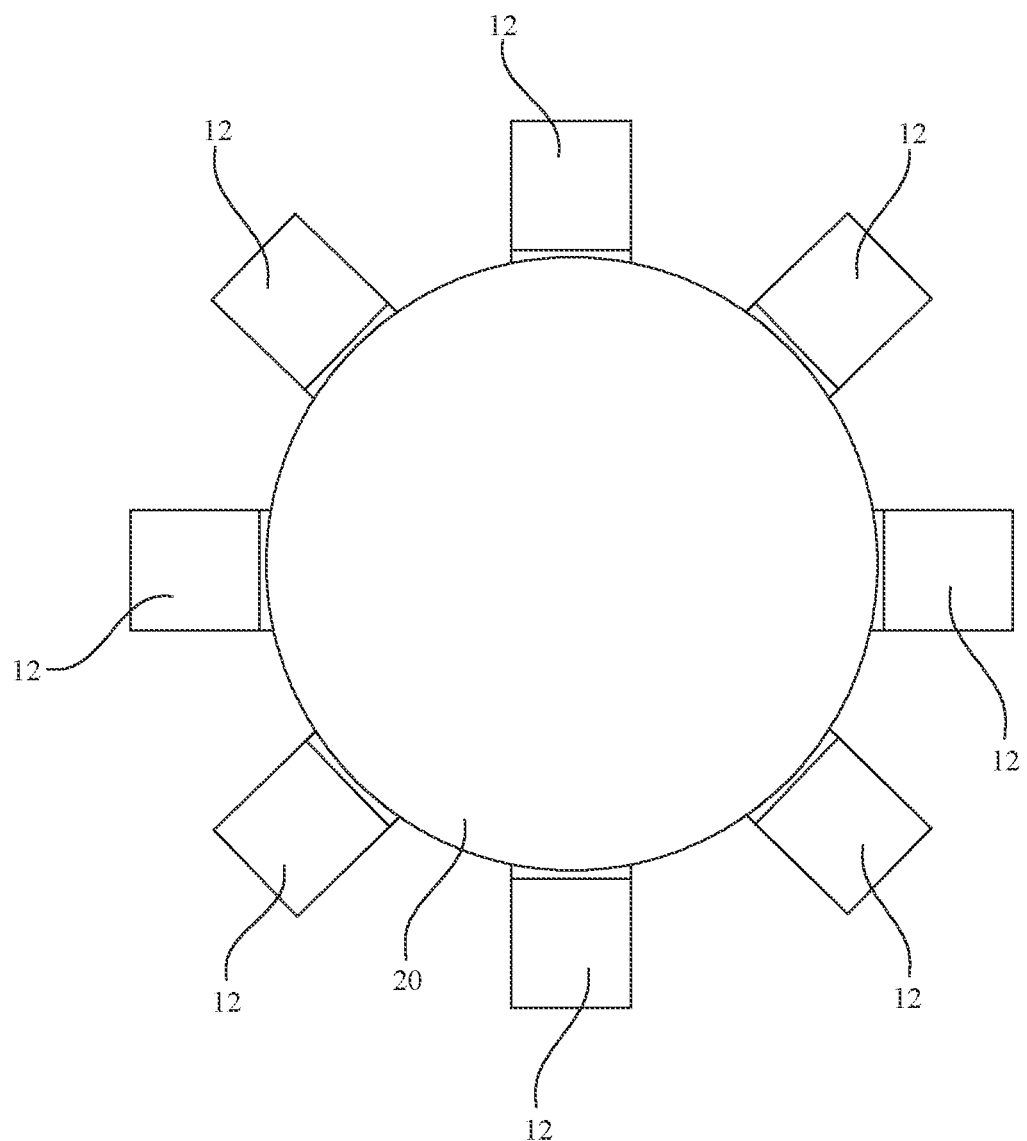
FIG. 5 is a first schematic diagram of an assembly structure of support frames and a filter of a camera module according to an embodiment of this application.
Figure 6:
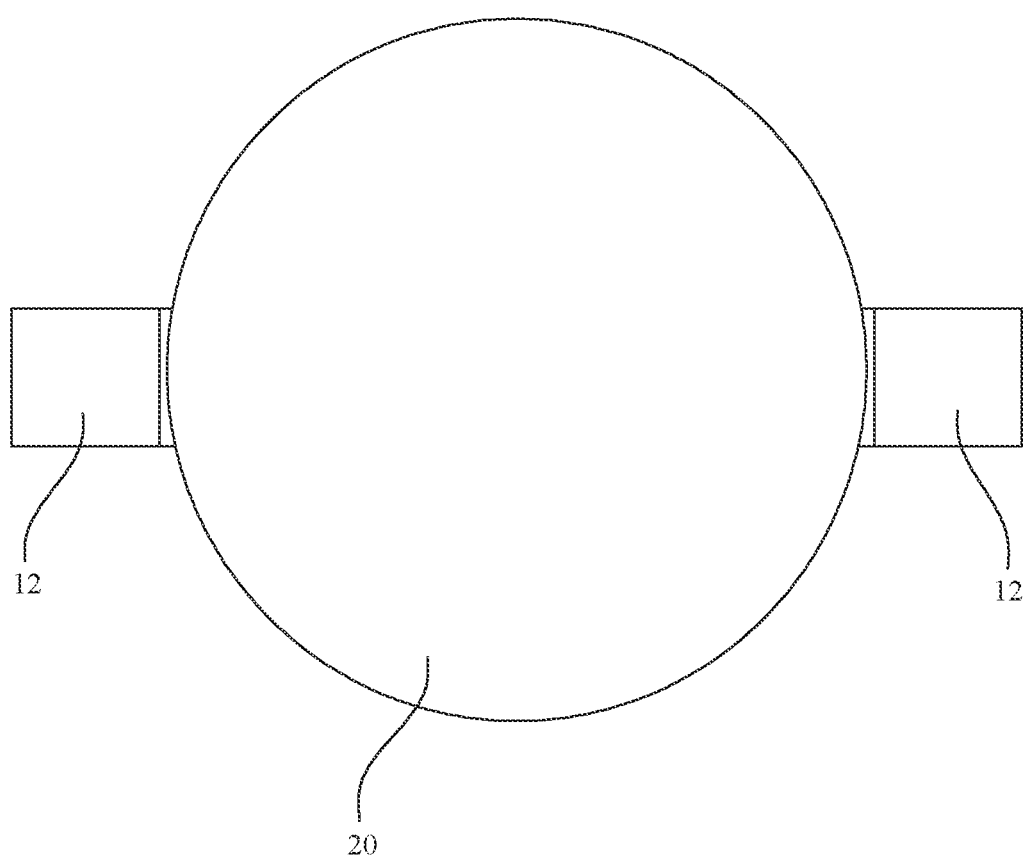
FIG. 6 is a second schematic diagram of an assembly structure of support frames and a filter of a camera module according to an embodiment of this application.

In some other embodiments of this application, as shown in FIG. 5, there may be at least three support frames 12 and at least three substrates 11, so as to stably support the filter 20 in the circumferential direction. All the substrates 11 are distributed on the periphery of the sensor 30. All the support frames 12 are also distributed on the periphery of the filter 20 and disposed on the corresponding substrates 11 respectively. For example, the quantity of the support frames 12 and the quantity of the substrates 11 are the same, and they are evenly distributed on the periphery of the filter. One buffer is disposed between one support frame 12 and one substrate 11 as a pair. The support frames 12 are evenly distributed on the periphery of the filter 20, so that forces from the support frames 12 received by the peripheral edge of the filter 20 can offset each other, thereby effectively realizing isotropy of the forces on the filter 20 and ensuring assembly stability of the filter 20 in the camera module. In addition, the substrates 11 annularly disposed on the periphery of the sensor 30 can also provide peripheral protection for the sensor 30, which improves survivability of the sensor 30 under an external impact and vibration. Because the support frames 12 and the substrate 11 are disposed correspondingly or in pairs, and are evenly distributed on the periphery of the sensor 30, each of the support frames 12 can be stably supported.

In some other embodiments of this application, as shown in HG. 6, there are two support frames 12 and two substrates 11, the two substrates 11 are disposed on two opposite sides of the sensor 30 respectively, and the two support frames 12 are disposed on the two substrates 11 respectively and located on two opposite sides of the filter 20 respectively. This can ensure force balance of the filter 20 and implement stable support to the filter 20, and can reduce costs, thereby achieving a balance between assembly stability of the filter 20 and a manufacturing cost of the camera module. In addition, this arrangement can further save an assembly space in the camera module, so that the assembled camera module can be more compact.

Figure 9:
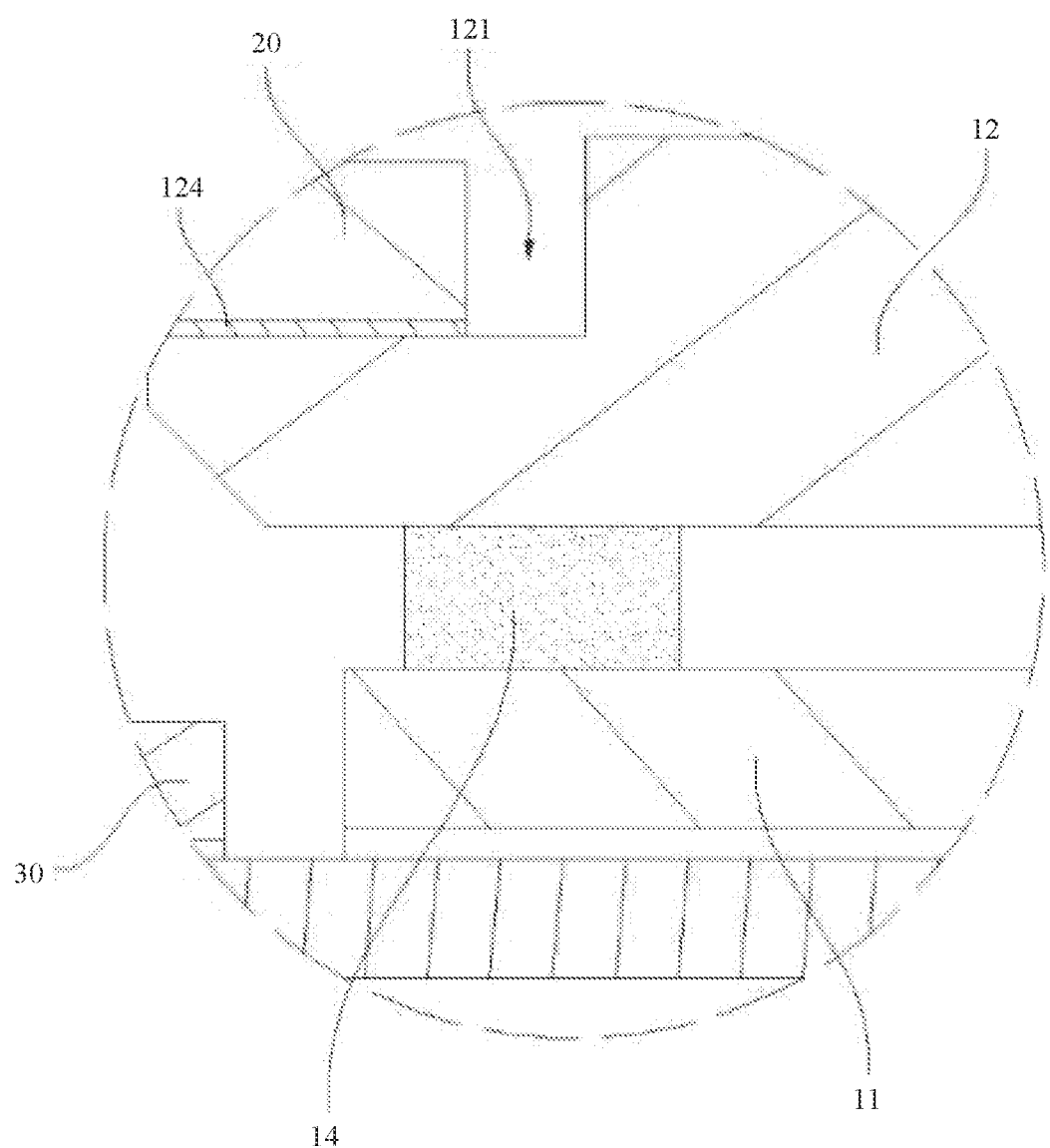
FIG. 9 is a first enlarged schematic diagram of an assembly structure of support frames and a filter of a camera module according to an embodiment of this application.
Figure 10:
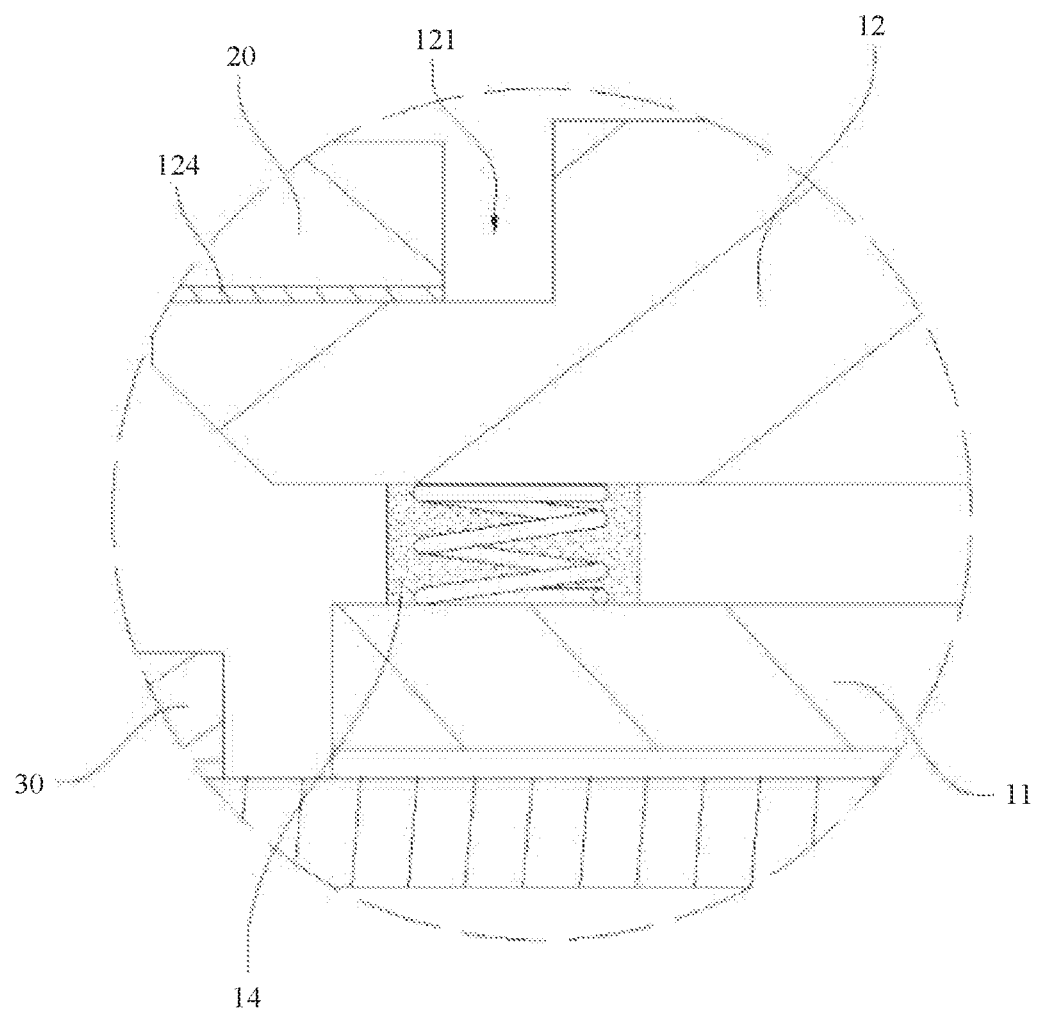
FIG. 10 is a second enlarged schematic diagram of an assembly structure of support frames and a filter of a camera module according to an embodiment of this application.

In some other embodiments of this application, as shown in FIG. 9 and FIG. 10, the filter connection part of the support frame 12 (that is, one side facing the filter 20) includes a lap joint notch 121, and the edge of the filter 20 can be fixed in the lap joint notch 121. The edge of the filter 20 is fixed in the corresponding lap joint notch 121. On the one hand, this enables the filter 20 and the support frame 12 to be quickly and stably assembled; and on the other hand, the lap joint notch 121 can further precisely limit the filter 20, thereby ensuring accuracy of relative positions of the filter 20 and the sensor 30.

Optionally, when the filter 20 and the support frame 12 are specifically assembled, the edge of the filter 20 can be disposed in the lap joint notch 121, then an assembly position of the filter 20 relative to the support frame 12 and the sensor 30 is determined first, and then the edge of the filter 20 can be fixed in the lap joint notch 121 by using various methods such as adhesive dispensing, so as to stably assemble the filter 20 and the support frame 12.

As shown in FIG. 9 and FIG. 10, edges of two opposite sides of the filter 20 adhere to two lap joint notches 121 by using adhesives 124 respectively Specifically, the edges of the filter 20 adhere in the lap joint notches 121 by using the adhesives 124, so that the assembly stability of the filter 20 and the support frame 12 can be ensured.

Optionally, a nail-free glue may be selected as the adhesive 124. On the one hand, due to the good bonding capability of the nail-free glue, assembly stability of the filter 20 and the support frame 12 is effectively ensured. On the other hand, because the nail-free glue is synthesized from resin and does not contain harmful substances such as formaldehyde, the use of the nail-free glue in the camera module enables the manufactured camera module to be more environmentally friendly, and further also enables a terminal device such as a mobile phone with the camera module to have more environmental protection advantages.

Figure 11:
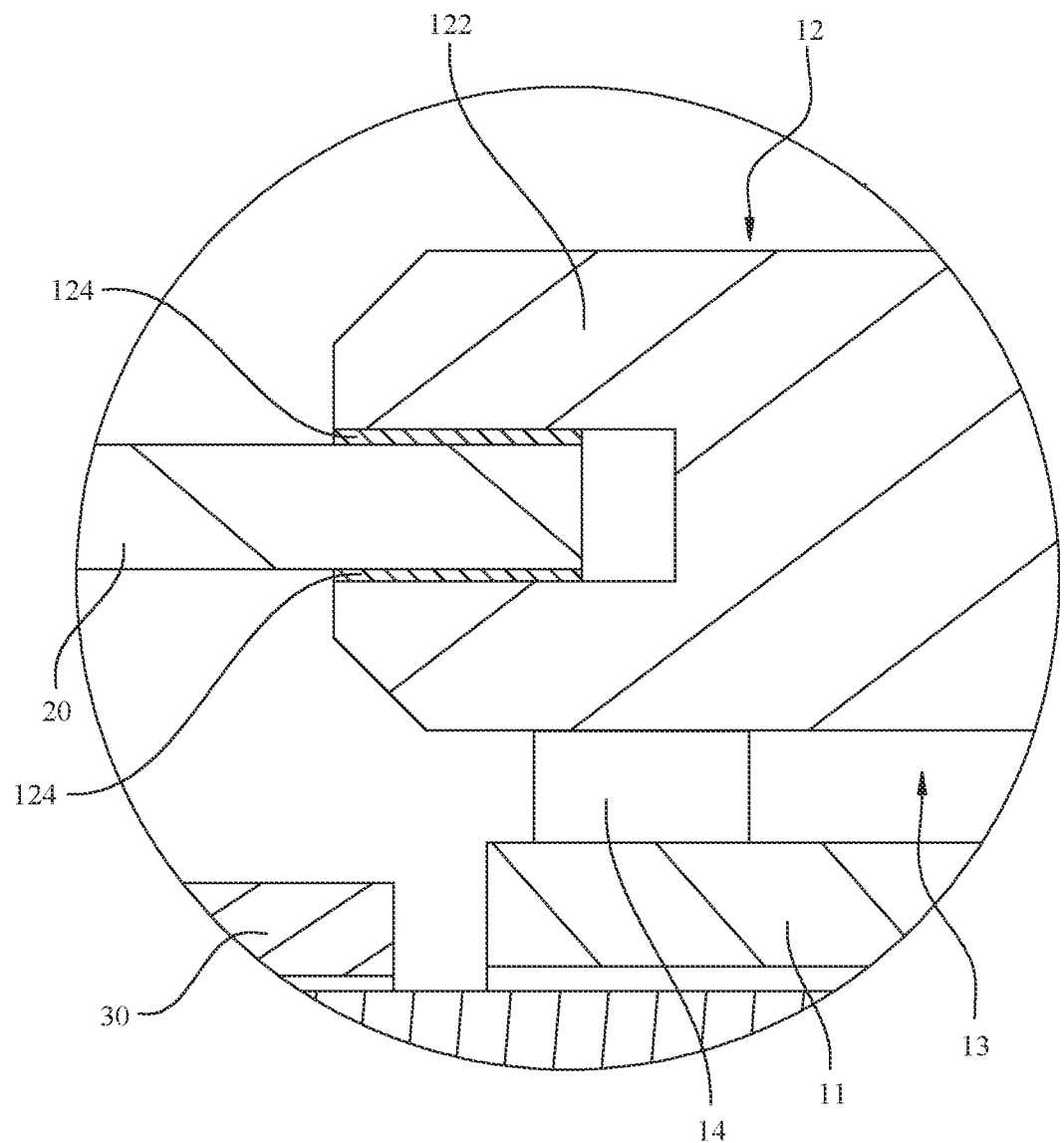
FIG. 11 is a third enlarged schematic diagram of an assembly structure of support frames and a filter of a camera module according to an embodiment of this application.

In some other embodiments of this application, as shown in FIG. 11, the filter connection part of the support frame 12 (one side facing the filter 20) is provided with a clamping part 122, and the edge of the filter 20 is clamped in the clamping part 122. For example, the clamping part 122 may include two clamping arms for clamping the edge of the filter 20. The clamping part 122 can reduce costs of assembly between the filter 20 and the support frame 12 and improve assembly efficiency. In addition, the edge of the filter 20 is clamped in the clamping part 122, so that the filter 20 is supported in the circumferential direction, and the upper and lower limit to the filter 20 is also achieved, thereby further reducing an amplitude of resonance or up-and-down shaking of the filter 20 when the filter 20 undergoes vibration.

Optionally, a position where the edge of the filter 20 is clamped in the clamping part 122 may be coated with the adhesive 124 or a protective film (not shown) to prevent a situation that stress concentration occurs due to hard collision between the edge of the filter and the clamping part 122, resulting in cracking of the clamping part 122. In addition, the adhesive 124 or the protective film can further fill a gap between the edge of the filter 20 and a clamping notch of the clamping part 122, so that the edge of the filter 20 is clamped in the clamping part 122 more firmly. For example, the coating adhesive 124 or the coating protective film may be located on two opposite surfaces of the two clamping arms.

In some other embodiments of this application, as shown in FIG. 11, one buffer 14 is disposed between the clamping part 122 and the corresponding substrate 11. Specifically, one assembly gap 13 may extend between the clamping part 122 and the corresponding substrate 11, the buffer 14 is disposed between the clamping part 122 and the substrate 11, which can directly offset the pressure of the filter 20 acting on the clamping part 122, thereby significantly reducing a shaking amplitude of the clamping part 122 protruding out of a main body of the support frame 12.

Specifically, because the clamping part 122 protrudes toward the filter 20 relative to the main body of the support frame 12, the clamping part 122 is also in a suspended state relative to the substrate 11 and needs to be effectively supported. The buffer 14 is arranged between the clamping part 122 and the corresponding substrate 11, so that the buffer 14 can support the clamping part 122 in a targeted manner, so as to protect the clamping part 122 from breakage caused by excessively large shaking moment of the filter 20, and ensure stability of mechanical properties of the clamping part 122.

Figure 7:
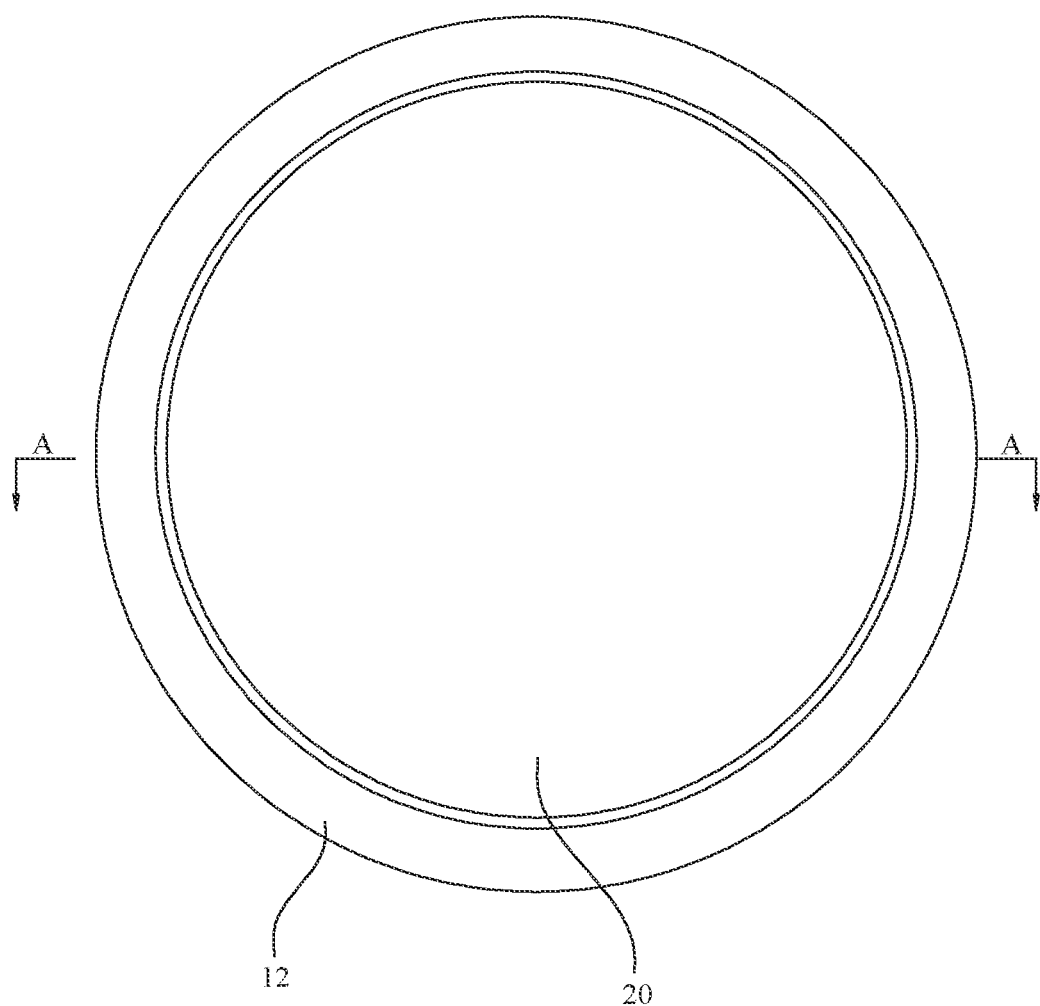
FIG. 7 is a third schematic diagram of an assembly structure of support frames and a filter of a camera module according to an embodiment of this application.

In some other embodiments of this application, as shown in FIG. 7, the support frames 12 each are an annular frame, the substrates 11 each are an annular plate, the substrates 11 are annularly disposed on the periphery of the sensor 30, and the support frames 12 are disposed on the substrates 11 and annularly disposed on the periphery of the filter 20. Specifically, as another specific form of assembling the filter 20 and the support frame 12, the support frames 12 and the substrates 11 are annular, which can enhance overall mechanical properties of the support frames 12 and the substrates 11, thereby enabling the support frames 12 to provide more stable support for the filter 20.

In addition, the support frames 12 and the substrates 11 in annular design also protect the filter 20 and the sensor 30 therein in the circumferential direction, and function as structural support members in the camera module, thereby also increasing overall strength of the camera module.

It should be noted that the foregoing annular design of the support frames 12 and the substrates 11 can be applied to a situation where the camera module is used in an environment with larger vibrations or impacts, so as to fully ensure assembly stability of the filter 20 in the camera module.

Figure 8:
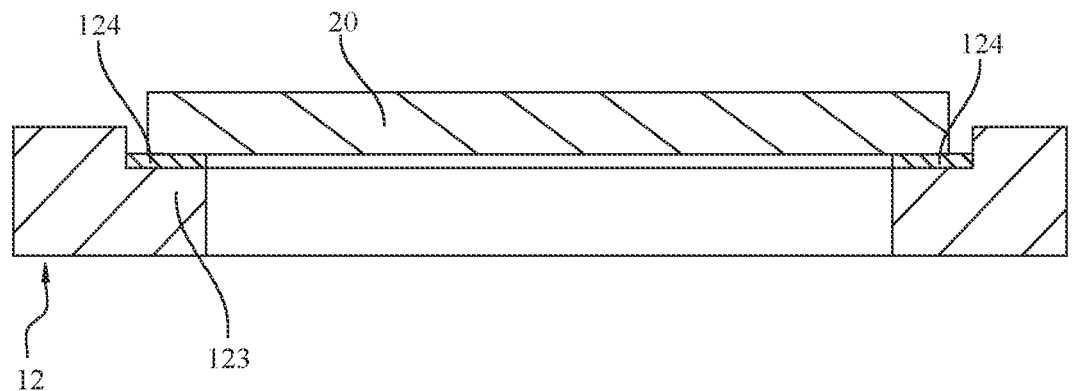
FIG. 8 is a sectional view taken along line A-A in FIG. 7.

In some other embodiments of this application, as shown in FIG. 8, when the support frames 12 are annularly designed, an edge of one side of each support frame 12 facing the filter 20 is provided with an assembly ring step 123, and the peripheral edge of the filter 20 is disposed and fixed on the assembly ring step 123. When the support frames 12 are annular frames, the edges of the filter 20 are disposed on the assembly steps to quickly align the filter 20 with the support frames 12. After the alignment of the filter 20 and the support frames 12 is completed, the edges of the filter 20 are fixed on the assembly steps through adhesive dispensing, so as to stably assemble the filter 20 and the support frames 12. This improves assembly efficiency and accuracy of the filter 20 and the support frames 12 while ensuring that the support frames stably supports the filter 20.

Optionally, the assembly steps each may be further coated with a layer of double-sided adhesive tape. When the filter 20 and the support frame 12 are aligned and installed, a protective film on the double-sided adhesive tape can be torn off, and the edge of the filter 20 directly adheres to the double-sided adhesive tape, so that assembly efficiency of assembling the filter 20 on the support frame 12 can be further improved while stable assembly of the filter 20 and the support frame 12 is ensured.

In addition, because the double-sided adhesive tape can achieve surface contact bonding with the filter 20, overall uniformity of the bonding position of the filter 20 and the double-sided adhesive tape is also ensured, so that the filter 20 is assembled more stably relative to the support frame 12.

In some other embodiments of this application, the buffers 14 each are integrally formed with the substrate 11 or the support frame 12; or, the buffers 14 each are an independent component and assembled between the support frame 12 and the substrate 11. Specifically, the integral forming of the buffer 14 with the substrate 11 or the support frame 12 can ensure assembly stability of the buffer 14 relative to the substrate 11 or the support frame 12, and the buffer 14 as an independent component can be disassembled, replaced and repaired relative to the support frame 12 and the substrate 11.

In some other embodiments of this application, the buffers 14 each are an elastic member; or, the buffers 14 each include a rigid member and a buffer layer disposed at least on one side of the rigid member facing the support frame 12. Specifically, when the buffer 14 needs to bear a limited load, the buffer may be an elastic member, and when the buffer 14 needs to bear a relatively large load, the buffer may alternatively be a rigid member with a buffer layer to ensure sufficient strength.

In some other embodiments of this application, as shown in FIG. 9 and FIG. 10, the elastic member is a glass cement, a nail-free glue, a structural adhesive, foamed cotton, a spring or a silicone block encapsulated with the spring. Specifically, the buffer 14 is set as the foregoing elastic object, Which can provide a relatively flexible support for the support frame 12 and can allow the support frame 12 to have controllable elastic deformation redundancy, thereby ensuring that there is elastic redundancy in an assembly relationship between the support frame 12 and the filter 20, and significantly reducing the probability that the support frame 12 and the filter 20 are damaged due to collision with each other when subjected to an external vibration force.

Optionally, the buffer 14 may be a combination of one or more of the foregoing objects. For example, the spring may be encapsulated in the glass cement, the nail-free glue or the silicone to enhance overall toughness of the buffer 14, so that the buffer 14 can bear a higher load.

In the foregoing various embodiments of this application, the buffer 14 may be in the following forms.

As shown in FIG. 9, the first specific implementation is to set the buffer 14 as the glass cement. In specific use, the glass cement may be first applied to a corresponding position of the substrate 11, and then the adhesive 124 at a corresponding position of the support frame 12 is disposed on the glass cement. In this way, after the glass cement is cured, the buffer 14 can be firmly bonded between the support frame 12 and the substrate 11, ensuring stability of its bonding position relative to the support frame 12 and the substrate 11. In this way, the buffer 14 is also prevented from easily falling off from the substrate 11 when subjected to vibrations or impacts. The glass cement has better flexibility after curing, which also enables the buffer 14 to effectively absorb and buffer the downward pressure or shaking moment received by the support frame 12.

The second specific implementation is to set the buffer 14 as the nail-free glue. While having the foregoing advantages of the glass cement, the nail-free glue can be more firmly bonded to the support frame 12 and the substrate 11, thereby further improving stability of its bonding position relative to the support frame 12 and the substrate 11.

As described above, as an environment-friendly glue that does not contain formaldehyde, the nail-free glue also enables the manufactured camera module to be more environmentally friendly. In addition, when the nail-free glue is used, due to its good bonding capability, the nail-free glue only needs to adhere to a corresponding position of the substrate 11 through adhesive dispensing without covering the entire substrate 11 with the glue, which can significantly reduce an overall manufacturing cost of the camera module.

The third specific implementation is to set the buffer 14 as the structural adhesive. Because the structural adhesive is suitable for bonding a wide range of objects, it can be used for bonding between metals, ceramics, plastics, rubber, wood, and other materials that are the same or different. This also makes the buffer 14 more tolerant of materials of the substrate 11 and the support frame 12.

In this way, no matter whether the substrate 11 and the support frame 12 are made of the same material or different materials, the structural adhesive can be used to implement firm bonding between the substrate 11 and the support frame 12. Then, when the camera module is used in an environment with frequent vibrations or impacts, due to the existence of the structural adhesive, the support frame 12 is stably supported when subjected to frequent vibrations and impacts.

In addition, because the structural adhesive further has a relatively large load bearing capacity and is resistant to aging, high temperature and corrosion, the structural adhesive can be used in the camera module stably, and can also maintain stable bonding performance and buffering performance during the service life.

The fourth specific implementation is to set the buffer 14 as foamed cotton. Due to good elastic deformation capacity of the foamed cotton, the foamed cotton can effectively absorb and buffer the downward pressure or shaking moment received by the support frame 12. In addition, the foamed cotton further features light weight, which can significantly reduce the overall weight of the camera module.

The fifth specific implementation is to set the buffer 14 as the spring or another elastic member. Due to good elastic deformation performance and better support performance of the spring, the spring can well support the support frame 12. When the support frame 12 shakes relatively violently, the spring can provide a strong supporting force to the support frame 12, so as to absorb and eliminate the shaking of the support frame 12 in a timely manner.

As shown in FIG. 10, the sixth specific implementation is to set the buffer 14 as the silicone block encapsulated with the spring. In this way, on the one hand, the combination of the spring and the silicone block makes the buffer 14 have better elastic deformation performance, so that the buffer 14 can provide good support for the support frame 12, and on the other hand, the silicone also suppresses unnecessary bounce of the spring, so that the buffer 14 can effectively suppress the shaking of the support frame 12 in a short time. Optionally, as another combination form of the buffer 14, the elastic elements such as the spring can also be encapsulated in the glass cement, the nail-free glue or the structural adhesive.

In some other embodiments of this application, the filter 20 is an infrared cut-off filter. Specifically, the infrared cut-off filter may be a blue glass sheet coated with an infrared short-wave cut-off film or the like. Due to higher transmittance of a blue wavelength, the blue glass sheet can filter out infrared light with a wavelength of 630 nm or above, so that the infrared cut-off filter using the blue glass sheet as a base material can effectively filter out a target surface virtual image formed by external infrared light acting on the sensor 30. Therefore, imaging quality of the camera module can be remarkably improved.

The above described are merely preferred embodiments of this application, and are not intended to limit this application. Any modification, equivalent replacement, improvement and the like made within the spirit and principle of this application shall fall within the protection scope of this application.

The invention claimed is:

1. A camera module, comprising:
   a support mechanism comprising two substrates, two support frames, and buffers;
   a filter, wherein an edge of the filter is fixed on the support frames; and
   a sensor disposed corresponding to the filter,
   wherein the two substrates are disposed on two opposite sides of the sensor, respectively, wherein the two support frames are each disposed on a corresponding substrate,
wherein an assembly gap is formed between each support frame and the corresponding substrate, and
wherein the buffers are disposed in each assembly gap.

2. The camera module of claim 1, wherein one side of each of the support frames facing the filter is provided with a lap joint notch, and the edge of the filter is fixed in the lap joint notch.

3. The camera module of claim 2, wherein the edge of the filter is fixed in the lap joint notch by an adhesive.

4. The camera module of claim 1, wherein the support frames each comprise a clamping part, and the edge of the filter is clamped in the clamping part.

5. The camera module of claim 4, wherein the buffers each are disposed between the clamping part and the corresponding substrate.

6. The camera module of claim 1, wherein the support frames each are an annular frame, the substrates each are an annular plate, the substrates are annularly disposed on a periphery of the sensor, and the support frames are disposed on the substrates and annularly disposed on a periphery of the filter.

7. The camera module of claim 6, wherein an edge of one side of each of the support frames facing the filter is provided with an assembly ring step, and a peripheral edge of the filter is disposed and fixed on the assembly ring step.

8. The camera module of claim 1, wherein a) the buffers each are integrally formed with the substrate or the support frame; or b) the buffers each are an independent component and assembled between the support frame and the substrate.

9. The camera module of claim 1, wherein a) the buffers each are an elastic member; or b) the buffers each comprise a rigid member and a buffer layer disposed at least on one side of the rigid member facing the support frame.

10. The camera module of claim 9, wherein the elastic member is a glass cement, a nail-free glue, a structural adhesive, foamed cotton, a spring, or a silicone block encapsulated with the spring.

11. The camera module of claim 1, wherein the assembly gap is formed between the substrate and a filter connection part of the support frame.

12. The camera module of claim 1, wherein electronic devices are disposed in the assembly gap.

13. A camera module, comprising:
a support mechanism comprising at least three support frames, at least three substrates, and buffers;
a filter, wherein an edge of the filter is fixed on the support frames; and
a sensor disposed corresponding to the filter,
wherein all the substrates are distributed on a periphery of the sensor,
wherein all the support frames are distributed on a periphery of the filter and each is disposed on a corresponding substrates,
wherein an assembly gap is formed between each support frame and the corresponding substrate, and
wherein the buffers are disposed in each assembly gap.

14. A terminal device, comprising:
a camera module, comprising:
a support mechanism comprising two substrates, two support frames, and buffers;
a filter, wherein an edge of the filter is fixed on the support frames; and
a sensor disposed corresponding to the filter,
wherein the two substrates are disposed on two opposite sides of the sensor, respectively,
wherein the two support frames are each disposed on a corresponding substrate,
wherein an assembly gap is formed between each support frame and the corresponding substrate,
wherein the buffers are disposed in each assembly gap; and
a display configured to display at least an image photographed by the camera module.

15. The terminal device of claim 14, wherein the assembly gap is formed between the substrate and a filter connection part of the support frame.

16. The terminal device of claim 14, wherein electronic devices are disposed in the assembly gap.

17. The terminal device of claim 14, wherein there are at least three support frames and at least three substrates, all the substrates are distributed on a periphery of the sensor, and all the support frames are distributed on a periphery of the filter and disposed on the corresponding substrates respectively.

18. The terminal device of claim 14, wherein one side of each of the support frames facing the filter is provided with a lap joint notch, and the edge of the filter is fixed in the lap joint notch.

19. The terminal device of claim 18, wherein the edge of the filter is fixed in the lap joint notch by an adhesive.

20. The terminal device of claim 14, wherein the support frames each comprise a clamping part, and the edge of the filter is clamped in the clamping part.

* * * * *